United States Patent

Grinberg et al.

[11] Patent Number: 5,764,389
[45] Date of Patent: Jun. 9, 1998

[54] HOLOGRAPHIC COLOR FILTERS FOR DISPLAY APPLICATIONS, AND OPERATING METHOD

[75] Inventors: Jan Grinberg, Los Angeles; John E. Gunther, Torrance, both of Calif.

[73] Assignee: Hughes Electronics Corporation, El Segundo, Calif.

[21] Appl. No.: 756,419

[22] Filed: Nov. 26, 1996

[51] Int. Cl.$^6$ .............................. G02B 5/32; G02B 5/18; G02F 1/1335
[52] U.S. Cl. .............................. 359/20; 359/15; 349/62; 349/95; 349/106
[58] Field of Search .............................. 359/20, 19, 16, 359/15, 565, 569, 568; 349/61, 62, 63, 95, 106

[56] References Cited

U.S. PATENT DOCUMENTS

| | | | |
|---|---|---|---|
| 4,686,519 | 8/1987 | Yoshida et al. | 349/95 |
| 4,798,448 | 1/1989 | Van Raalte | 347/62 |
| 4,807,978 | 2/1989 | Grinberg | 350/3.73 |
| 5,161,042 | 11/1992 | Hamada | 359/41 |
| 5,272,551 | 12/1993 | Lehureau et al. | 359/19 |
| 5,410,421 | 4/1995 | Huignard et al. | 359/19 |
| 5,615,024 | 3/1997 | May et al. | 359/19 |
| 5,621,547 | 4/1997 | Loiseaux et al. | 359/15 |
| 5,680,231 | 10/1997 | Grinberg et al. | 359/19 |

*Primary Examiner*—Jon W. Henry
*Attorney, Agent, or Firm*—V. D. Duraiswamy; W. K. Denson-Low

[57] ABSTRACT

A holographic optical filter separates broadband electromagnetic radiation into spectral components corresponding to different spectral regions and then images this radiation onto pixels of a display. It includes two layers of holographic optical elements that are sensitive to each of these spectral regions. The holographic optical elements generally transmit radiation outside of their bandpass but can diffract radiation falling within it. The filter is well suited for display applications and can be used in either a reflective or transmissive mode.

26 Claims, 5 Drawing Sheets

FIG. 6

HOLOGRAPHIC COLOR FILTERS FOR DISPLAY APPLICATIONS, AND OPERATING METHOD

BACKGROUND OF THE INVENTION

1. Field of the Invention

This invention relates to an optical filter for separating broadband electromagnetic radiation into various spectral components, especially for use in color display systems.

2. Description of the Related Art

A conventional method for achieving full color performance in a color display such as a backlit, transmissive flat-panel matrix display employs a repeated series of red, green and blue transmissive filter stripes to color code incident white light. The white light passes through the absorptive dye filter stripes, which transmit the filter color but absorb other colors. The matrix display likewise consists of a repeated series of red, green and blue information-containing lines or pixels The filter stripes are precisely registered with respect to the matrix display so that the red, green and blue light emerging from the filters passes through the red, green and blue information-containing stripes or pixels of the matrix display, respectively. A typical display may have 525 color lines, which are visually integrated by the viewer to produce a full color image.

In this kind of system, the projection display is often based on liquid crystals, but they have several limitations. A single liquid crystal device (LCD) for all three primary colors in combination with internal absorption color filters can utilize at most one-third of the white illumination light, since red, blue and green filters only transmit their respective colors while absorbing the other two. Another absorption loss results from the fact color filters are not 100% efficient. For example, the best red filter will transmit most red light but absorb the rest. An additional optical loss results from the presence of transistors and aluminum conductors. While these components are necessary to apply an electric field, they compete for space with the color filters and occlude some fraction of the illumination light. The efficiency of the LCD is further reduced by a factor of two if an input polarizer is used.

It is also possible to provide a full color display from a monochromatic cathode ray tube (CRT) by means of one or more color light valves which respond to the CRT output. In one approach, three CRTs are employed with three separate light valves and associated optics to produce an integrated full color display. The system does not suffer from the filter absorption losses, but does require a complex and costly optical system employing dichroic beamsplitters that separate the white illumination light into the three primary colors and then recombine the red, blue and green images created by the separate LCDs. Another approach uses three one-inch CRTs to address a two-inch light valve with optics that combine the three primary color images on the screen. Still another approach involves a sequential addressing of a CRT/light valve combination by the red, green and blue fields, and synchronous rotation of a color wheel in front of a light valve. To accomplish this, a very fast CRT/light valve combination is needed in addition to a three field memory. More than two-thirds of the light is lost in the system and fails to appear on the output display.

A color display system that addresses these problems is disclosed in U.S. Pat. No. 4,807,978, entitled "COLOR DISPLAY DEVICE AND METHOD USING HOLOGRAPHIC LENSES" issued Feb. 28, 1989 to Jan Grinberg and Ronald T. Smith. In this system, a full color display is achieved using a holographic lens assembly. The assembly is composed of discrete holograms which are sensitive to different wavelength bands of light. Each hologram focuses (via diffraction) input light within its waveband onto a corresponding target area, and generally transmits input light outside of its waveband. A separate target area is provided for each hologram so that incoming light is divided into its constituent colors. The separate color stripes may then be operated upon to produce a desired display. By generally transmitting rather than absorbing light outside the band of each hologram, the lens assembly achieves a high degree of both efficiency and resolution compared to other prior display systems. In addition, the holographic lens assembly allows one to avoid the complicated lithographic process used to deposit the color stripes used in some of the other prior art approaches.

For this invention to work, however, the illumination light must strike the holographic lens assembly at an oblique angle that lies within the acceptance angle range of the hologram. Every hologram has acceptance angle and wavelength ranges over which it will diffract light (referred to as the angular bandwidth and spectral bandwidth, respectively). With respect to angular bandwidth, holograms generally exhibit a peak diffraction efficiency at a peak acceptance angle, with a progressively diminishing diffraction efficiency as the acceptance angle moves away from the peak angle. For projection-view systems in which the image is projected onto a screen, the angular bandwidth limitation of the holograms is not as critical to the operation of the display system because the illumination source can be chosen so that the divergence of the illumination light falls within the angular bandwidth of the holograms being used. However, for direct-view systems, in which room light or other highly diverging light sources are used as the readout illumination source, the relatively narrow angular bandwidth of the holograms will result in inadequate color purity. This is because a portion of the light that is incident on the holograms at angles away from their peak diffraction angles will pass through the holographic lens assembly undiffracted. This undiffracted light will strike random target areas and frustrate the color separation (also referred to as the color purity) of the device.

A hologram is also characterized by its spectral bandwidth curve. That is, the hologram exhibits a peak diffraction efficiency for a given wavelength of the readout beam with a progressively diminishing diffraction efficiency as the readout beam wavelength moves away from this wavelength. For display systems in which narrow band readout sources can be chosen to match the spectral bandwidth of the holograms (such as projection-view systems), the spectral bandwidth limitation is not as critical. For example, red, green and blue lasers could be used as the readout illumination sources. However, for display systems which utilize white light as the illumination source (such as direct-view display systems), the narrow spectral bandwidth of the individual holograms will result in inadequate color purity.

A copending application to Ronald T. Smith (Ser. No. 08/578,264, filed Dec. 26, 1995) proposes to address the limited diffraction efficiency of the invention described in U.S. Pat. No. 4,807,978 by introducing a broadband holographic grating between the white illumination light and the holographic lens assembly that is used to diffract the red, green and blue light towards their respective color filters. The broadband holographic grating diffracts light propagating normal to the grating towards the holographic lens assembly at an oblique angle, resulting in a better match with the angular bandwidth of the assembly which yields correspondingly better resolution of the primary colors. Without this grating, it is necessary to first orient the white illumination light at an oblique angle with respect to the holographic lens assembly, which for some applications presents insurmountable engineering challenges. However, a broadband (or "rainbow") hologram does not efficiently diffract light across the entire spectrum. Thus, the overall efficiency of the invention of the copending application is significantly limited by the broadband hologram, and there is still a need for a holographic device that is efficient over a broad wavelength range.

SUMMARY OF THE INVENTION

In accordance with the present invention, a holographic lens system acts as an optical filter by separating broadband electromagnetic radiation into different spectral regions such as blue, red and green. The filter is designed to spectrally resolve radiation propagating nominally perpendicular towards the filter, and works best when the direction of propagation of the radiation deviates from the normal axis to the filter by less than approximately 10 degrees. The filter is preferably designed so that radiation that exits the filter also propagates nominally perpendicular to it, which is useful for display systems such as those having a liquid crystal layer. In this case, the filter can be combined with the liquid crystal layer to form either a reflective or a transmissive device, depending upon whether the liquid crystal layer includes a reflecting surface.

The optical filter uses bending and focusing layers of holographic optical elements, in which the bending and focusing layers are preferably joined by an optically transparent spacer. The holographic optical elements are designed for different spectral regions, so that radiation within a given spectral region is significantly diffracted only by elements that correspond to that spectral region, and is substantially unaffected by elements corresponding to other spectral regions. For example, blue light can be diffracted by elements designed for blue light, but is substantially unaffected by "green" and "red" elements.

Elements in the bending layer designed for a given spectral region image radiation within that spectral region towards elements in the focusing layer designed for the same spectral region, preferably at an oblique angle to enhance the diffraction efficiency of the elements in the focusing layer. Furthermore, the elements of the bending layer are staggered with respect to the elements of the focusing layer, so that radiation which passes through the bending layer undiffracted reaches elements in the focusing layer corresponding to its spectral region, nominally at a perpendicular angle. This focusing layer is designed to diffract light that is incident at an oblique angle. Incident light that is nominally perpendicular to the focusing layer is transmitted through it substantially unaffected except for a narrow cone of light at the center of each element which is diffracted off axis.

The bending layer is preferably designed to separate white light into blue, red and green spectral components that are imaged towards the focusing layer, where light that has an oblique angle of incidence is focused by blue, red and green elements, respectively. When the filter is used in conjunction with a liquid crystal layer, the elements in the focusing layer preferably have a one-to-one correspondence with pixel sites of a display device.

In one embodiment, the holographic optical elements of the bending layer are field lenslets that diffract and focus radiation corresponding to their respective spectral regions. Alternatively, the elements of the bending layer may be field grating components which do not focus radiation but act like miniature mirrors that deflect it. The elements of the focusing layer are preferably focusing lenslets that act like microlenses to focus radiation that has an oblique angle of incidence.

The present invention offers several advantages over other light filters used for display applications. Because it uses holographic optical elements rather than colored filters to separate white illumination radiation into various spectral components, the absorption losses are substantially reduced. Also, the invention works efficiently over a broad wavelength range, since it is comprised of holographic optical elements that are tailored for different spectral regions, in contrast with, say, broadband holograms which are spatially homogeneous, such as those of copending application Ser. No. 08/578,264. The efficiency of the invention is enhanced by the use of the bending layer, which images radiation towards the focusing layer at an oblique angle, so that the radiation's direction of propagation better matches the acceptance angle of the holograms in the focusing layer. The bending layer also allows the filter to be used with radiation that is propagating normal to the filter. Also, when field lenslets are used in the bending layer, the optical dispersion of the focusing layer partially compensates that of the bending layer, permitting the spectral components of the illumination light to be more efficiently separated.

Further features and advantages of the invention will be apparent to those skilled in the art from the following detailed description, taken together with the accompanying drawings.

DETAILED DESCRIPTION OF THE INVENTION

As shown in the accompanying figures, the present invention is a holographic optical filter, especially for use with display systems such as those involving liquid crystal layers. All of the optical filters disclosed herein are designed for use with radiation (especially white illumination light) that is propagating nominally perpendicular to the filter, i.e. the angle of incidence is less than about ten degrees from the normal to the filter.

Figure 1:
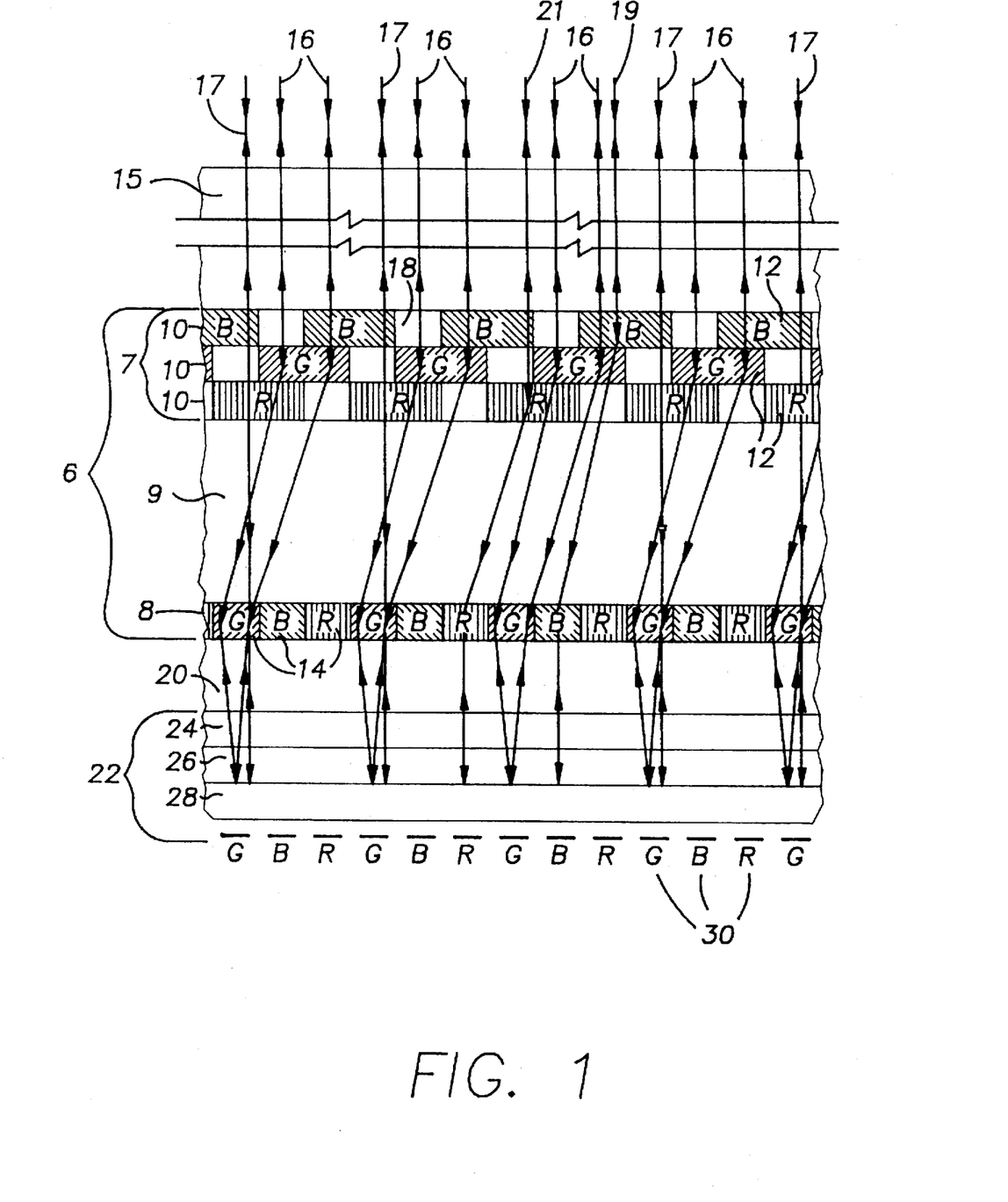
FIG. 1 is an illustrative sectional view of an embodiment of the invention that uses lenslets in a bending layer to bend and focus incident illumination light towards a focusing layer, in which the invention is combined with a liquid crystal device to form a reflective device.

One embodiment is shown in FIG. 1. An optical filter 6 comprises a bending layer 7 and a focusing layer 8 separated from each other by an optically transparent spacer 9 that preferably has a thickness on the order of 20 microns. The bending layer 7 segregates light by color and directs the separated colors towards the focusing layer 8, preferably at an oblique angle so that the diffraction efficiency of the focusing layer is enhanced. The bending layer 7 includes three tiers 10 of field lenslets 12 that are holographic optical elements. The focusing layer 8 comprises focusing lenslets 14 which are also holographic optical elements. The holographic optical elements in all embodiments are preferably 1 micron thick, exposed holographic polymer such as Dupont Chemical Company's OmniDex™ material. Spacer 9 can be unexposed photopolymer material or optically clear polymer film such as PVC, and preferably has an index of refraction matching that of its surrounding layers. The bending layer 7 is preferably deposited on an optically transparent substrate 15, which is preferably 3 mm thick glass and serves as a platform for the holographic optical elements and spacer 9.

The field lenslets 12 and the focusing lenslets 14 are microscopic lenses that can diffract and focus either red, green or blue light (i.e. one of the three primary colors). For example, green light is largely unaffected by "blue" or "red" elements (elements designed for the blue and red, respectively), whereas it can interact strongly with green elements. The holographic optical elements are labeled R, G or B in the figures to indicate that only light of that color interacts with an element so labeled. Likewise, light rays and pixel sites are labeled R, G, or B. In principle, holographic optical elements can be constructed for spectral regions other than red, green or blue, but the primary colors are of special interest for color display applications. The field lenslets 12 within each tier 10 are separated by unexposed spaces 18 in the holographic photopolymer material. Spaces 18 are therefore non-focusing continuations of the tiers 10 and do not affect the direction of propagation of light of any color that enters them.

FIG. 1 shows that incoming green light rays 16 and 17 are not diffracted by the red and blue elements in bending layer 7. However, green light rays 16, which enter the bending layer 7 above green elements in that bending layer, are strongly diffracted by them towards the focusing layer 8, and in particular, towards focusing lenslets 14 that are designed for green light. Likewise, blue and red light rays 19 and 21 (only one ray each for these two colors is shown in FIG. 1 for the sake of clarity) are diffracted by blue and red field lenslets 12 towards blue and red focusing lenslets 14, respectively. The focusing lenslets in all embodiments only focus light of their respective colors when that light is incident at an oblique angle, whereas light that enters a focusing layer nominally perpendicularly passes through it substantially unaffected (e.g. light rays, 17), except for a narrow cone of light at the center of each focusing element which is diffracted off axis (not shown in the figures) Because green light passes undiffracted through the red and blue elements as well as the spaces 18, the positions of field lenslets 12 and focusing lenslets 14 are staggered with respect to each other, so that, for example, focusing lenslets 14 designed for green light are positioned underneath field lenslets 12 corresponding to blue and red light. In this way, green light rays 17, which enter bending layer 7 directly above one of the focusing lenslets 14 designed for green light, pass through bending layer 7 undiffracted, straight into this focusing lenslet that bends and focuses green light incident at an oblique angle. On the other hand, green light entering bending layer 7 directly above focusing lenslets 14 designed for blue and red light is diffracted by field lenslets 12 designed for green light towards focusing lenslets 14 designed to focus oblique green light. The green light so diffracted enters focusing lenslets 14 at an oblique angle, where the efficiency of the holograms is greatest. Thus, red, green and blue spectral components are segregated from each other by bending layer 7, and each is imaged towards focusing lenslets 14 corresponding to its color.

The field lenslets 12 in FIG. 1 are thus preferably twice the width of the focusing lenslets 14 (which would be about 10 microns wide for displays having pixels 10 microns in width), since each field lenslet 12 of a given primary color is positioned above two focusing lenslets 14 corresponding to the other two primary colors.

Light from the focusing lenslets 14 is segregated by color and imaged substantially perpendicular to the optical filter 6 and towards an LCD 22. LCD 22 is separated from the optical filter 6 by an optically transparent cap 20, preferably 150 micron thick glass, that adjoins filter 6. The LCD 22 comprises a transparent electrode sheet 24, a liquid crystal layer 26, a partially conducting broadband reflector 28, and pixel drive electrodes 30 that define the pixel sites. Voltage signals for turning the pixels on and off are applied across electrode sheet 24 and the electrodes 30. Light from the focusing layer 8 passes through the cap 20, the electrode sheet 24 and the liquid crystal layer 26, in turn, before reaching reflector 28. As indicated in FIG. 1, each pixel drive electrode 30 corresponds to the primary color of the light directed by the focusing lenslet 14 that images light towards that electrode. By applying individual voltages to each of the electrodes 30, the modulated light within the liquid crystal layer 26 can be varied, thereby controlling the amount of light that is projected towards a viewer. Thus, optical filter 6 and LCD 22 form a reflective device suitable for liquid crystal panel displays that rely on a broadband, white light source.

Figure 2:
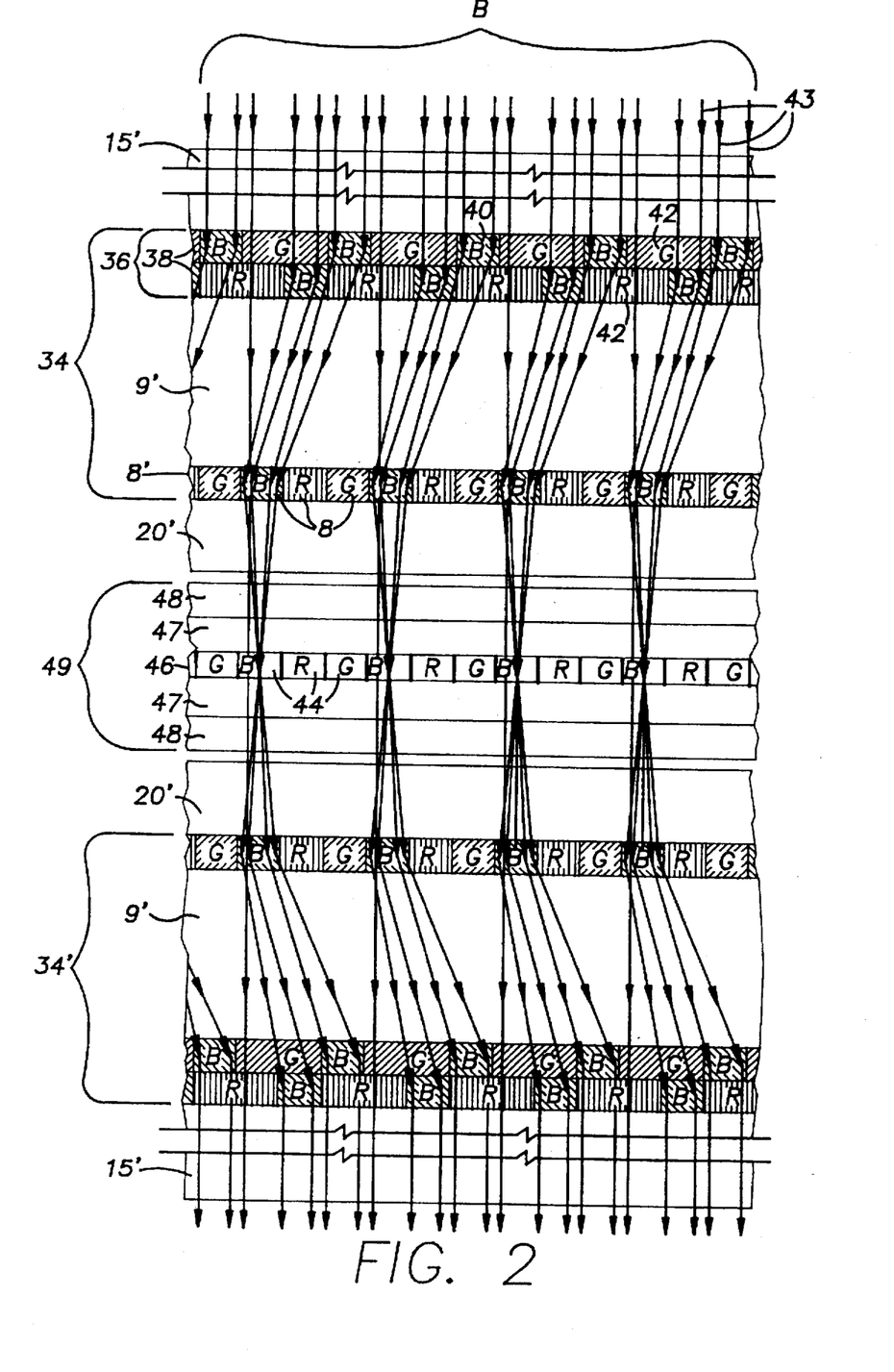
FIG. 2 is an illustrative sectional view of another embodiment similar to FIG. 1 combined with a liquid crystal device to form a transmissive device.

FIG. 2 shows a transmissive device, as opposed to the reflective device of FIG. 1. An optical filter 34 includes a bending layer 36 which utilizes the unexposed spaces 18 of the holographic polymer material in a close packing approach but is otherwise identical to and functions like bending layer 7 of FIG. 1. The bending layer 36 has two tiers 38, each of which includes blue field lenslets 40 that utilize what corresponds to the unexposed spaces 18 in optical filter 6. Accordingly, the blue field lenslets 40 have half the width of their red and green counterparts, field lenslets 42. In this and the other embodiments in which one color plays a unique role, analogous embodiments can be constructed in which one of the other two primary colors is used instead. Optical filter 34 also includes a focusing layer 8' and an optically transparent spacer 9 which function like their counterparts in FIG. 1. Optical filter 34 is therefore a slightly more compact version of optical filter 6 and can be used as a reflective device like the embodiment of FIG. 1. Optically transparent substrate 15' and optically transparent cap 20' function like their counterparts in FIG. 1.

FIG. 2 shows the optical filter 34 imaging incoming blue light rays 43 towards pixel sites 44 of a liquid crystal layer 46 sandwiched between two ITO (indium tin oxide) layers 47, in which each of the two ITO layers 47 are capped by glass layers 48. Liquid crystal layer 46, ITO layers 47, and glass layers 48 form part of an LCD 49 that can be used in transmission. Green and red light rays are not shown in FIG. 2 for the sake of clarity but are diffracted and focused (or transmitted) substantially as they are in FIG. 1. A second optical filter 34' designed like its counterpart 34 is situated on the opposite side of the LCD 49. Optical filter 34' collimates light that passes through the LCD 49. Filter 34' is also preferably joined to an optically transparent substrate 15' and an optically transparent cap 20', which function like their counterparts in FIG. 1. Thus, LCD 49 and optical filters 34 and 34' form a transmissive device like those in which illumination light originates from behind a display screen. Optical filter 34' is unnecessary in the reflective device of FIG. 1, since reflector 28 reimages light back though optical filter 34.

Figure 3:
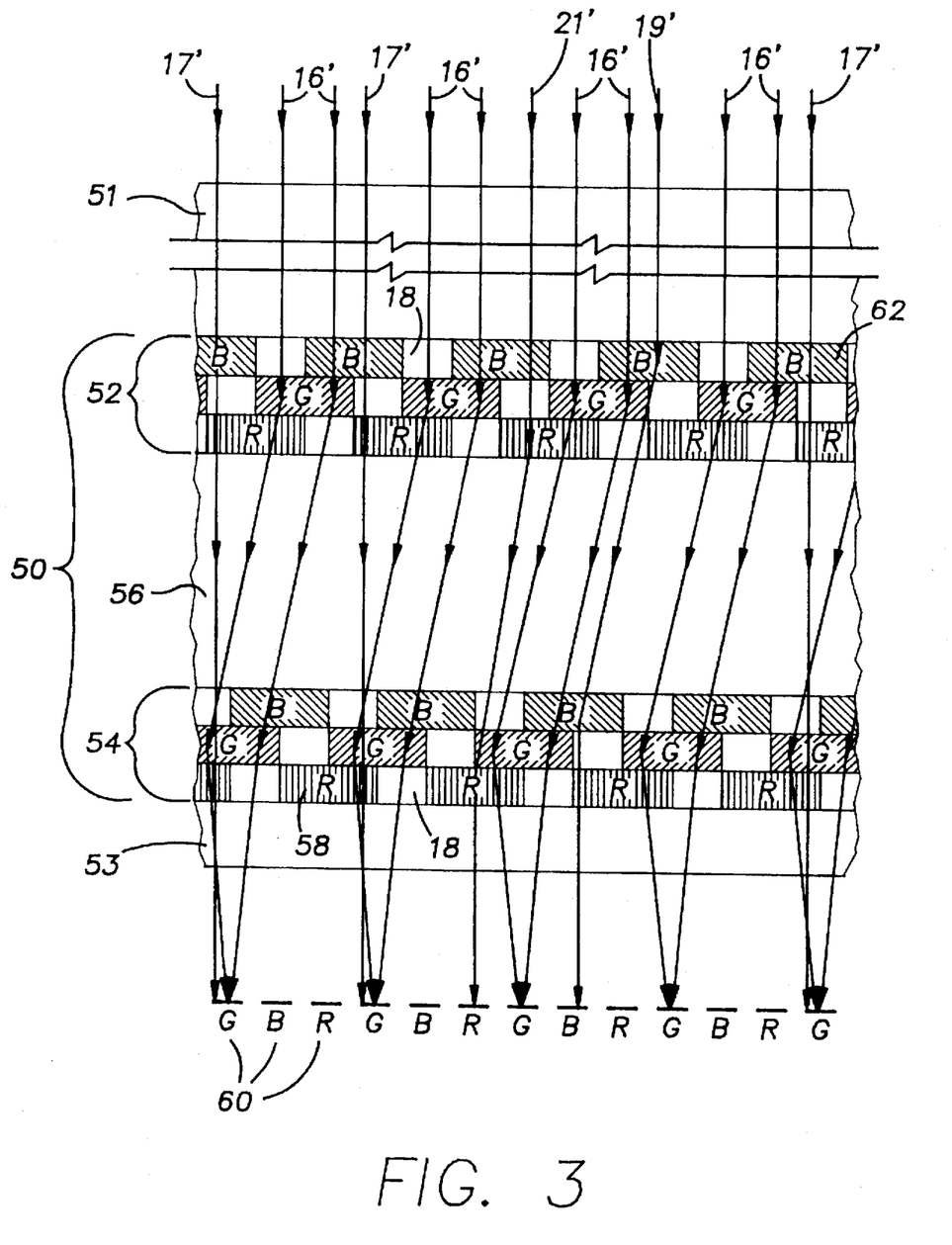
FIG. 3 is an illustrative sectional view of an embodiment that uses microscopic field grating components, with the bending and focusing layers each including 3 tiers of holographic optical elements having a width of nominally two pixels.

FIG. 3 shows an optical filter 50 that comprises a bending layer 52, a focusing layer 54, and an optically transparent spacer 56 that functions like its counterpart spacer 9. Filter 50 is adjoined to an optically transparent substrate 51 and an optically transparent cap 53, which function like substrate 15 and cap 20, respectively. Like all the embodiments disclosed herein, the bending layer 52 separates broadband radiation into red, green and blue light and images this light towards focusing lenslets 58 in the focusing layer 54 designed for red, green and blue light, respectively. This red, green and blue light is then focused by the focusing layer 54 towards pixel sites 60. Incoming green light rays 16' and 17' illustrate how green light is imaged towards pixels sites 60 designated "G". Likewise, blue and red light rays 19' and 21' are imaged to their respective pixel sites 60. Unlike the embodiments of FIGS. 1 and 2, however, bending layer 52 comprises field grating components 62 which are holographic optical elements that do not focus light, but rather diffract it uniformly across their apertures at a constant angle. The effect is that field grating components 62 act like a mirror to reflect light. For this reason, the focusing lenslets 58 are offset from their field grating components 62 by a distance that depends upon the thickness of the spacer 56 as well as how steeply the light is bent. In this embodiment, however, there are unexposed spaces 18 in both the bending and focusing layers 52 and 54.

Figure 4:
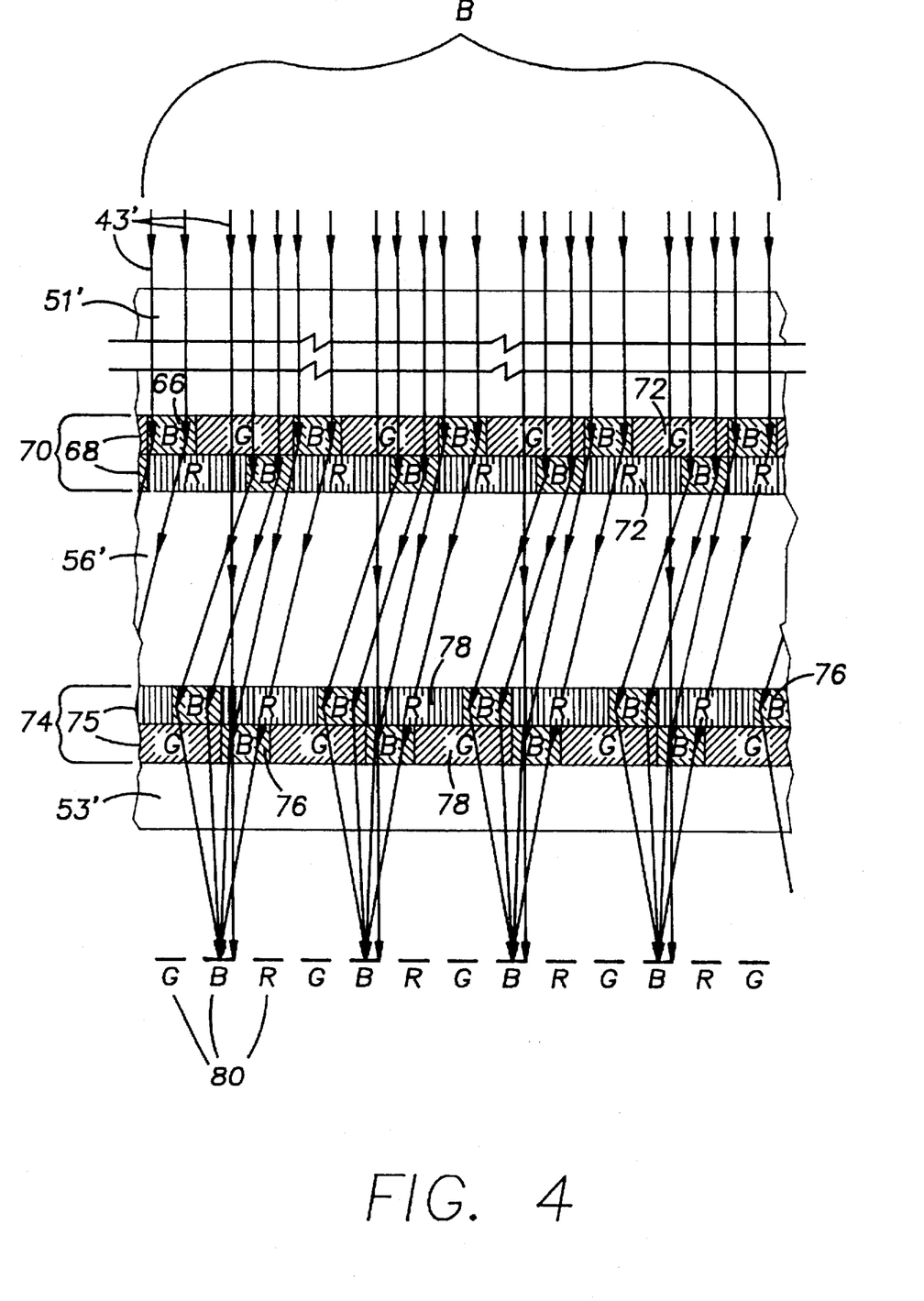
FIG. 4 is an illustrative sectional view of a more compact version of the embodiment shown in FIG. 3, in which the bending and focusing layers each include 2 tiers of holographic optical elements.

FIG. 4 discloses an embodiment that does not have unexposed spaces but has in their place blue field grating components 66 in both tiers 68 of a bending layer 70, where the blue field grating components 66 have half the width of their green and red counterparts, field grating components 72. A focusing layer 74 that has two tiers 75 comprised of blue focusing lenslets 76 and red and green focusing lenslets 78 is configured in a similar manner. Alternatively, one could construct the bending layer 70 to have three tiers 68 and the focusing layer 74 to have two tiers 75, or vice versa. As in the other embodiments of this invention, focusing lenslets 76 and 78 direct light towards pixel sites 80, and the bending layer 70 and the focusing layer 74 are connected by an optically transparent spacer 56'. Blue light rays 43' show the optical path taken by blue light towards the pixel sites 80. Green and red light rays are not shown in FIG. 4 for the sake of clarity but are diffracted and focused (or transmitted) substantially as they are in FIG. 3. An optically transparent substrate 51' and an optically transparent cap 53' function like their counterparts in FIG. 3.

Figure 5:
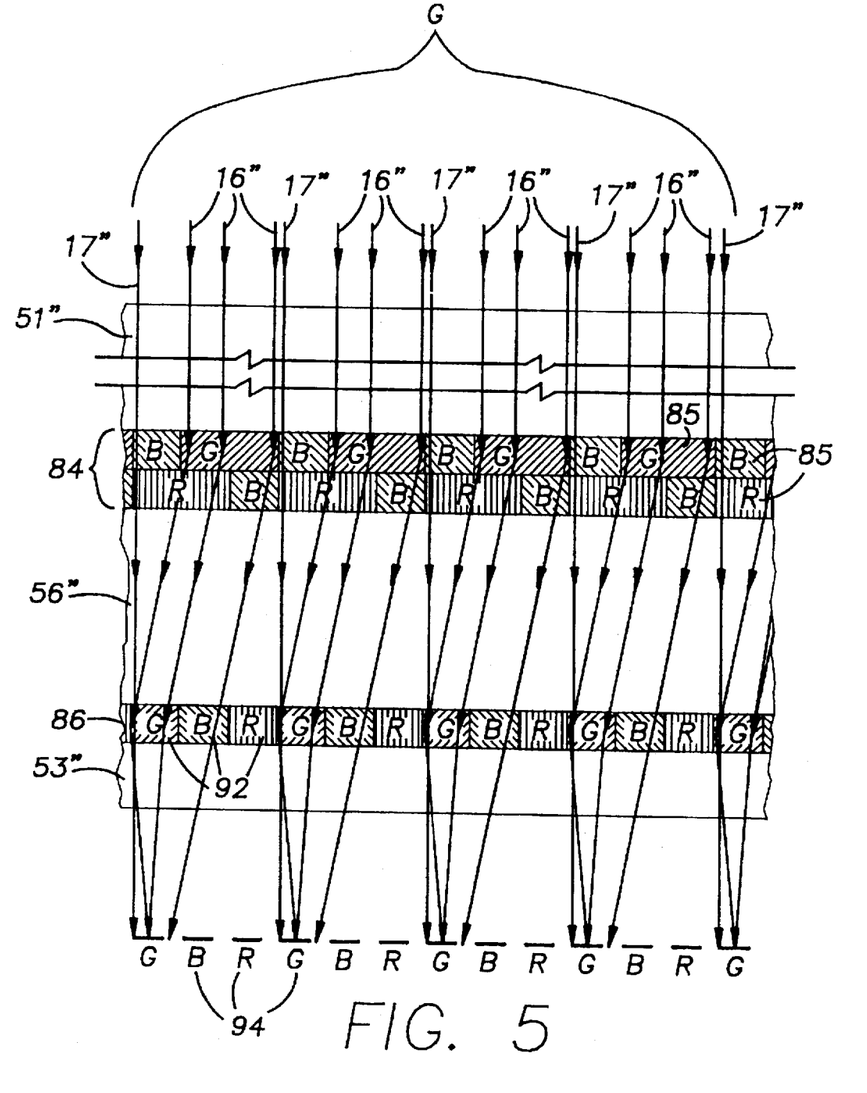
FIG. 5 is an illustrative sectional view of a simplified, but less efficient, version of the embodiment shown in FIG. 4, in which the focusing layer includes only one tier of holographic optical elements.

FIG. 5 shows an embodiment that has a bending layer 84 that is like bending layer 70 in FIG. 4. Bending layer 84 comprises field grating components 85 and is connected to a focusing layer 86 by an optically transparent spacer 56". Focusing layer 86 consists of a single tier of focusing lenslets 92. As illustrated in FIG. 5 by incoming green light rays 16" and 17", only one-half of the green light (as well and blue and red) diffracted by the field grating components 85 is imaged onto focusing lenslets 92 designed for green.

Focusing layer 86 is nevertheless simpler in design, and approximately two-thirds of the light of any given color reaches pixel sites 94 intended for that color. An optically transparent substrate 51" and an optically transparent cap 53" function like their counterparts in FIG. 3.

Figure 6:
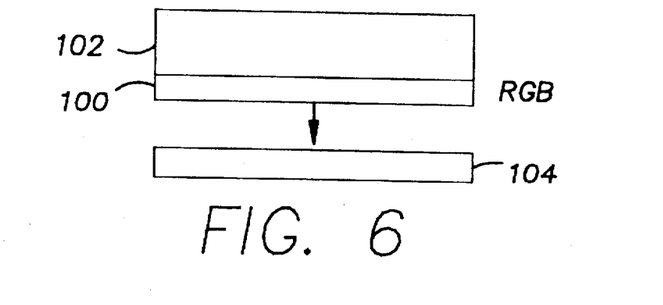
FIG. 6 is a side view of an embodiment that includes a single layer containing scattering centers for all of the colors instead of three individual tiers.

Methods for constructing holograms of optical components are well known in the art and are discussed extensively in U.S. Pat. No. 4,807,978 to J. Grinberg and R. T. Smith. In general, creating a hologram of an object involves the steps of splitting a laser beam into two beams, reflecting one of the beams (the recording beam) off of the object onto a recording medium such as photopolymer film, while simultaneously illuminating the recording medium with the other beam to form an interference pattern therein. The exposed photopolymer material is then baked for two hours at 120–140° C., which fixes the holographic structure in the film. A capping layer may then be added to seal the film. Multi-layered holograms like those disclosed herein can be constructed by either fabricating the various layers individually and laminating them together, or building layers sequentially by depositing a layer of holographic recording material on a substrate (e.g. by a spinning or lamination process) and recording the hologram in that layer before depositing the next layer. The sequential deposition approach is preferable for this invention, given the difficulties inherent in precisely aligning holograms. Alternatively, one can record several holograms (e.g., corresponding to different colors) in just one layer of material, provided it has sufficiently high index modulation. For example, instead of constructing individual tiers of red, green and blue focusing lenslets, all three tiers can in principle be recorded in a single layer 100 of high index modulation material on a substrate 102 with an optically transparent cap 104 or spacer protecting the other side of the film layer (FIG. 6), in which each color has its own scattering centers. This is conceptually equivalent to compressing the red, green and blue tiers into each other to form a single tier. In this case, holographic optical elements of different colors can share the same space, and individual elements must be thought of as functional units and not as physically separate, conventional optical components that cannot overlap.

While particular embodiments of the invention have been shown and described, numerous variations and alternate embodiments will occur to those skilled in the art. Accordingly, it is intended that the invention be limited only in terms of the appended claims.

We claim:

1. An optical filter for separating broadband electromagnetic radiation propagating nominally perpendicular towards said filter into spectral components corresponding to different spectral regions, comprising:

bending and focusing layers separated from each other, said layers including holographic optical elements for each spectral region, wherein radiation within each spectral region is significantly diffracted only by elements corresponding to that spectral region and is generally transmitted by elements that do not correspond to that spectral region, said bending layer segregating radiation according to said different spectral regions by imaging radiation within each spectral region generally only towards elements of said focusing layer corresponding to that spectral region, and wherein radiation entering said focusing layer at an oblique angle is focused by said focusing layer.

2. The optical filter of claim 1, comprising an optically transparent spacer that joins said layers.

3. The optical filter of claim 2, wherein said elements of said bending layer are staggered with respect to said elements of said focusing layer, such that radiation within each spectral region which passes substantially undiffracted through said bending layer reaches elements in said focusing layer corresponding to that spectral region.

4. The optical filter of claim 3, wherein said elements of said bending layer are staggered with respect to said elements of said focusing layer, such that radiation within each spectral region that is diffracted by said bending layer is bent at an oblique angle towards elements in said focusing layer corresponding to that spectral region.

5. The optical filter of claim 4, wherein said elements of said focusing layer comprise focusing lenslets.

6. The optical filter of claim 5, wherein said elements of said bending layer comprise field lenslets.

7. The optical filter of claim 6, wherein said spectral regions correspond to the three primary colors: red, green and blue.

8. The optical filter of claim 7, wherein said field lenslets corresponding to each of said red, green and blue colors are located in respective tiers that adjoin each other.

9. The optical filter of claim 7, wherein said field lenslets are located in two tiers that adjoin each other.

10. The optical filter of claim 7, wherein said field lenslets corresponding to said red, green and blue colors are located in one tier.

11. The optical filter of claim 5, wherein said elements of said bending layer comprise field grating components.

12. The optical filter of claim 11, wherein said spectral regions correspond to the three primary colors: red, green and blue.

13. The optical filter of claim 12, wherein said field grating components corresponding to each of said red, green and blue colors are located in respective tiers that adjoin each other.

14. The optical filter of claim 13, wherein said focusing lenslets corresponding to each of said red, green and blue colors are located in respective tiers that adjoin each other.

15. The optical filter of claim 12, wherein said field grating components are located in two tiers that adjoin each other.

16. The optical filter of claim 15, wherein said focusing lenslets are located in two tiers that adjoin each other.

17. The optical filter of claim 15, wherein said focusing lenslets are located in a single tier.

18. The optical filter of claim 12, wherein said field grating components corresponding to said red, green and blue colors are located in a single tier.

19. The optical filter of claim 5, further comprising:
a liquid crystal device including a reflector, wherein radiation passes through said optical filter, enters said liquid crystal device, and is reflected off of said reflector back through said liquid crystal device, said optical filter and said liquid crystal device forming a reflective device.

20. The optical filter of claim 5, further comprising:
a liquid crystal device, wherein radiation passes through said liquid crystal device, enters said optical filter, said optical filter and said liquid crystal device forming a transmissive device.

21. A transmissive device, comprising:
a first optical filter for separating broadband electromagnetic radiation propagating nominally perpendicular towards said filter into spectral components corresponding to different spectral regions, said filter including:

bending and focusing layers separated from each other, said layers including holographic optical elements for each spectral region, wherein radiation within each spectral region is significantly diffracted only by elements corresponding to that spectral region and is generally transmitted by elements that do not correspond to that spectral region, said bending layer segregating radiation according to said different spectral regions by imaging radiation within each spectral region generally only towards elements of said focusing layer corresponding to that spectral region, and wherein radiation entering said focusing layer at an oblique angle is focused by said focusing layer; and an optically transparent spacer joining said layers;

a second optical filter like said first optical filter; and a liquid crystal device situated between said optical filters, wherein radiation passing through said first optical filter and said liquid crystal device passes through said second optical filter.

22. The transmissive device of claim 21, wherein said elements of said bending layers are staggered with respect to said elements of said focusing layers, such that radiation within each spectral region which passes substantially undiffracted through said bending layers reaches elements in said focusing layers corresponding to that spectral region.

23. The transmissive device of claim 22, wherein said elements of said bending layers are staggered with respect to said elements of said focusing layers, such that radiation within each spectral region that is diffracted by said bending layers is bent at an oblique angle towards elements in said focusing layers corresponding to that spectral region.

24. A method of separating broadband electromagnetic radiation into spectral components corresponding to different spectral regions, comprising:

positioning a first layer of holographic optical elements nominally perpendicular to the direction of propagation of said broadband electromagnetic radiation, said first layer including holographic optical elements for each spectral region;

segregating said broadband electromagnetic radiation with said first layer according to said different spectral regions;

directing said segregated electromagnetic radiation towards a second layer that includes holographic optical elements for each spectral region, wherein radiation within each spectral region is directed generally only towards holographic optical elements corresponding to that spectral region; and focusing said segregated electromagnetic radiation with said second layer.

25. The method of claim 24, wherein said holographic optical elements only significantly diffract radiation that corresponds to their respective spectral regions and generally transmit radiation that does not correspond to their respective spectral regions.

26. The method of claim 25, wherein said spectral regions correspond to the three primary colors: red, green and blue.

* * * * *